Jan. 7, 1964 K. O. PARKER 3,116,944
PIPE JOINT
Filed Feb. 25, 1959 2 Sheets-Sheet 1
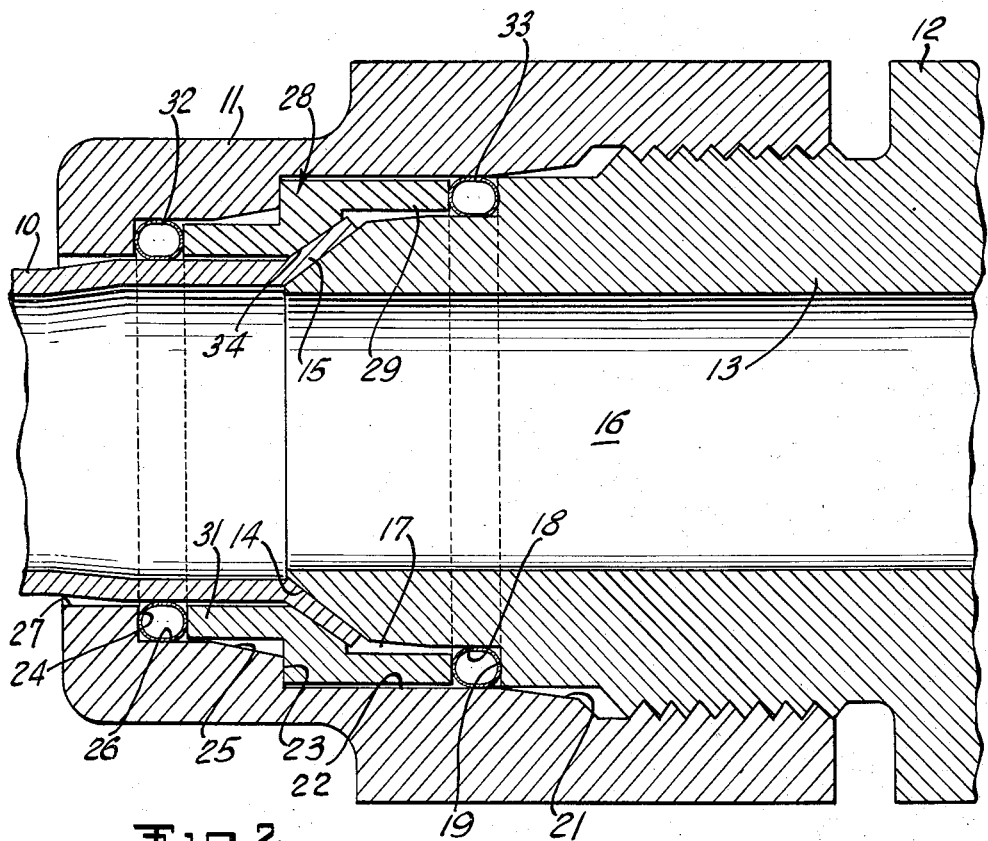
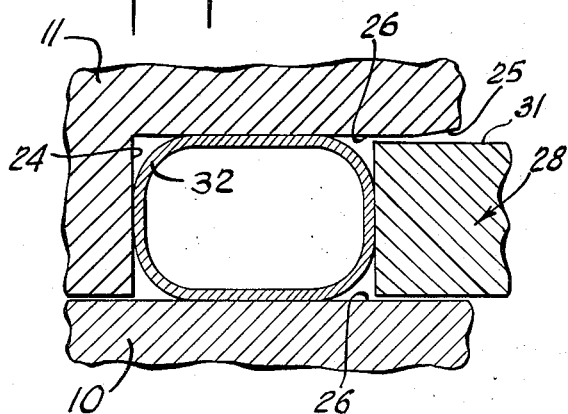
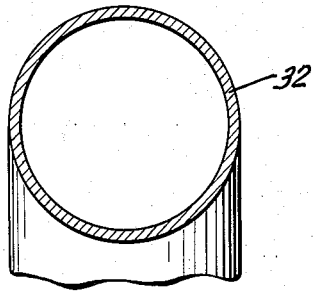
INVENTOR
KENNETH O. PARKER
BY J.E. Beringer
His ATTORNEY Jan. 7, 1964 K. O. PARKER 3,116,944
PIPE JOINT
Filed Feb. 25, 1959 2 Sheets-Sheet 2

INVENTOR
KENNETH O. PARKER.
BY
His ATTORNEY

United States Patent Office 3,116,944
Patented Jan. 7, 1964

3,116,944
PIPE JOINT
Kenneth O. Parker, Dayton, Ohio, assignor to United Aircraft Products, Inc., Dayton, Ohio, a corporation of Ohio
Filed Feb. 25, 1959, Ser. No. 795,442
5 Claims. (Cl. 285—332.2)

This invention relates to pipe joints, and particularly to a sealing arrangement in such joints providing an effective seal under conditions of extreme temperature and pressure.

An object of the invention is to present a means to compensate for relaxation of the structure members of a coupling, including the threads, as might be caused by sudden and large changes in temperature and pressure conditions.

Another object of the invention is to utilize the inherent resilience of a metallic O-ring or like device to produce a compensating movement in the pipe joint.

A further object of the invention is to provide a simple, easily assembled and disassembled, coupling which can be installed on standard tubing with the use of hand tools only, and wherein the obtaining of a proper degree of compression of the sealing ring or rings is automatically arrived at.

Still another object of the invention is to obtain a radially acting seal of especially effectiveness in avoiding loss of sealing contact between longitudinally separable members.

Other objects and structural details of the invention would appear from the following description when read in connection with the accompanying drawing, wherein:

FIG. 1 is a fragmentary view in cross-section of a pipe joint or coupling in accordance with the illustrated embodiment of the invention;

FIG. 2 is a detail view, enlarged with respect to FIG. 1, of a portion of an installed sealing ring;

FIG. 3 is a detail view of a fragment of a sealing ring showing the configuration thereof prior to installation in the coupling;

Figure 4:
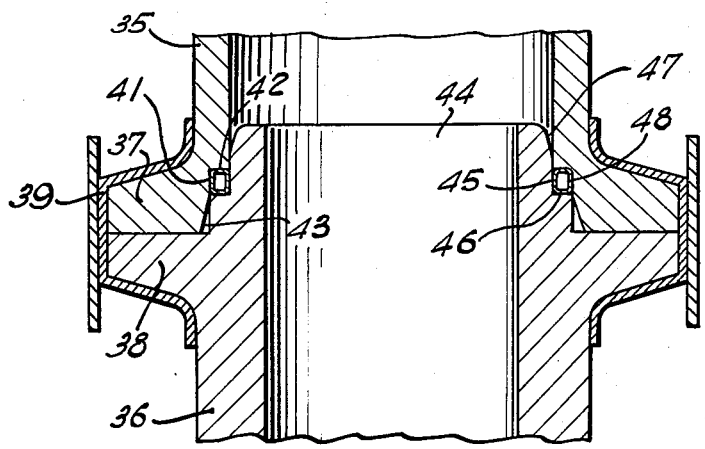
FIG. 4 is a detail view in cross section of another embodiment of the invention, showing the obtaining of a radially acting seal in a clamped joint.

Referring to FIG. 1 of the drawing, a joint or coupling in accordance with this illustrated embodiment of the invention serves to interconnect adjoining ends of a tube or pipe 10. The joint comprises a first or outer body member 11 and a second or inner body member 12. The body 12 has a stem or shank portion 13 which is received within one end of the outer body member 11 and which terminates in a conical end portion 14. The pipe end 10 is received in the opposite end of the body member 11 and terminates in a flared portion 15 adapted to seat on the conical surface 14 in a manner to define a sealed joint. The stem or portion 13 of the body member 12 has a through bore 16 registering with and communicating with the pipe 10 whereby to conduct fluid to the other adjoining end of the pipe, it being understood in this connection that the body member 12 is symmetrical with a second stem or projection 13 in opposed relation to the one illustrated, and there further being a second outer body member thereon like the body 11.

Rearwardly or outwardly of the conical surface 14 on the stem portion 13 the exterior of the stem is formed with an inclined surface 17. This in turn terminates in a cylindrical portion 18 while the latter ends in a radial wall or shoulder 19. Beyond the shoulder 19, the stem 13 is externally threaded to mate with internal threads on the outer body member 11. Within the body member 11, inwardly or to the left of the internal threads thereof, the surface of the body member 11 is formed with a taper formation 21 terminating in a cylindrical portion 22 of a size to receive the shoulder 19 of body member 12. The portion 22 terminates in an internal ledge of shoulder 23 while the body is again counterbored to provide a further step-down portion resulting in an internal shoulder 24. Interconnecting the shoulders 23 and 24 is a taper formation 25 and a cylindrical formation 26. An opening 27 in the body element 11 admits the tube end 10.

Also contained in the body element 11, and in surrounding relation to the adjacent ends of the tube end 10 and the stem 13, is a floating member 28. It is comprised of a cylindrical portion 29 aligned in the cylindrical portion 22 of the outer body element, with one end thereof seating against the internal shoulder 23. Another cylindrical portion 31 of the member 28 is offset from the portion 29 and extends into the cylindrical portion 26 of the body member.

A resilient ring seal 32 is mounted in the annular groove defined by the shoulder 24, cylindrical portion 26 and the adjacent end 31 of the floating member 28. A similar ring seal 33 is contained in an annular groove defined by the cylindrical portion 18 on the stem 13, the shoulder 19 thereon and the adjacent end 29 of the floating member 28. Ring 32 makes a sealing contact between the surface 26 of body element 11 and the external surface of tube 10. Ring seal 33 makes a similar contact between cylindrical surface 18 and the surface 22 of the outer body member. In the one case an escape of fluid out of the coupling by way of opening 27 is inhibited and in the other case escape by way of the threads interconnecting the two body elements 11 and 12 is inhibited. The sealing rings engage their respective surfaces with an inherent resilience, which according to a feature of the invention is predetermined as to degree and automatically arrived at in the assembly of the coupling. Thus, in pressing the ring 32 into place to a seat on the shoulder 24, it is constrained by the taper formation 25 to be laterally compressed. Initially, the sealing ring is round as indicated in FIG. 3 but when compressed by installation in the body member it assumes a generally oval configuration as indicated. The sealing ring, in this instance a hollow metallic O-ring, tends to resist such compression and so tends to maintain a tight seal with the radially engaged surfaces. The ring may be internally pressurized for greater sealing effect, or be self-energized for a balancing out of pressures under control. The taper 25, the sealing ring dimensions and the size of cylindrical surface 26 all are proportioned, it will be understood, to obtain a predetermined degree of compression of the sealing ring and to obtain such compression automatically as a function of the assembly of the parts. The sealing ring 33 is similarly given an initial compression by assembly of the parts and through the cooperation of tapers 17 and 21.

Further in the assembly of the parts, it will be seen that as the stem 13 is advanced into the outer body member 11, the end 29 of the floating member 28 is engaged and the floating member is urged toward a seat on the shoulder 23. At about the same time this shoulder is engaged, however, the end 31 of the floating member engages the ring seal 32. Continued advance of the stem 13 accordingly results in a longitudinal compression of the sealing rings 32 and 33 as the floating member is brought to a seat on shoulder 23. Compressed both laterally and longitudinally, the sealing ring assumes substantially the shape shown in FIG. 2. In attempting to recover from this compression, in a longitudinal sense, the sealing ring 32 applies a longitudinal thrust to the floating member 28 outwardly or toward the stem 13. Intermediate its ends the floating member 28 is formed with an inclined surface 34 conforming in shape to the flared end 15 of the tube 10 and adapted to engage such flared portion. The thrust applied to the floating member by ring seal 32, therefore, is transmitted to the flared end of the tube in a manner to press it against the conical end 14 of the stem 13. A continuous, resilient pressure thus is applied toward the maintaining of the original seal at the flare 15. Temperature variations, as might result for example from severe quenching conditions within the coupling, and which tend to produce a relaxation of the structure members of the coupling, including the threads, are compensated for and the seal is maintained.

Referring to FIG. 4, in this illustrated embodiment of the invention, interengaged components 35 and 36 have respective mating flanges 37 and 38, an external clamp 39 holds the flanges in abutting contacting relation. The interengaged end of member 35 is counterbored to define, in longitudinally spaced relation to the bottom plane of flange 37, a cylindrical surface 41 terminating at its one end in a transverse shoulder 42. From the other end of surface 41 in a flared or outwardly tapering surface 43 extends to the bottom plane of flange 37. The member 36 has a nose like central projection 44 adapted to be received within the member 35. An external forming of such projection provides a cylindrical surface 45 terminating at its one end in a transverse shoulder 46. From the other end of surface 45 an inwardly extending taper 47 extends to the extremity of projection 44.

In the assembled condition of the joint the cylindrical surfaces 41 and 45 are in laterally aligned, spaced relation, and, similarly the transverse shoulders 42 and 46 are in longitudinally aligned spaced relation. The several surfaces define an annular groove in which is installed an O-ring 48 like the rings 32 and 33 and having also initially a round configuration. An O-ring is selected for use having an initial diameter larger than the width of its mounting groove, as defined by the distance between surfaces 41 and 45, which diameter may also exceed the spacing between the surfaces 42 and 46. In the assembly of the parts an uncompressed O-ring is placed on the tapered surface 47 on nose 44 or is dropped into the tapered formation 43 in member 35. Then the members 35 and 36 are aligned with one another and brought into telescoping relation, relative longitudinal motion continuing until limited by abutment of the flanges 37 and 38 with one another. Application of the clamp 39 then holds the parts detachably against disassembly.

During advance of nose 44 into the member 35, the O-ring is gripped between the tapered surfaces 43 and 47 and gradually compressed in a radial sense, a maximum degree of compression being reached and held as the cylindrical surfaces 41 and 45 achieve their aligned position in cooperative relation with the ring. In this position of the parts, therefore, the ring is under radial compression and so makes a resilient sealing contact with the surfaces 41 and 45 inhibiting an escape of pressure fluid thereby. A back-up for the ring is provided by either one or both of the surfaces 42 and 46. In the illustrated instance the ring is subject to longitudinal compression between the surfaces 42 and 46 but such compression is unnecessary to an effective sealing of the surfaces 41 and 45.

The concept of radial sealing here expressed obviates the loss of a sealed joint as might result from relative bowing or separating motion of the members 35 and 36 due to excessive pressure and temperature differential effects. Thus if the surfaces 42 and 46 were the principal sealed surfaces a bowing or relative extending motion of the member 35, for example, draws the surface 42 away from the surface 46. The natural resilience of the sealing ring tends to compensate for this motion but under extreme conditions the separation of the sealed surfaces may exceed the permitted recovery of the sealing ring. The radial seal retains the advantages of the compressed O-ring without, however, having to cope with the problem of excessive deflection. The surfaces 41 and 45 obviously may be made long enough to keep the ring under compression against any possible extent of longitudinal separation of the parts 35 and 36. Relative lateral motion of the parts substantially is precluded by the interfitting character of the connection between the parts.

Figure 5:
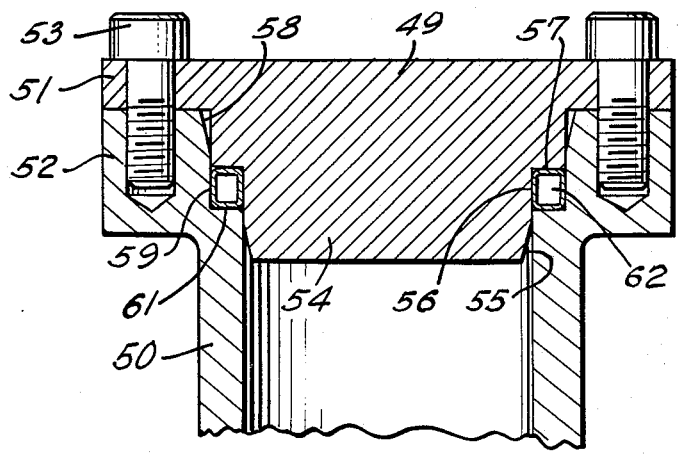
FIG. 5 is a view similar to FIG. 4 showing a coupling or closure characterized by a bolted joint.

The embodiment of FIG. 5 shows a radially sealed joint essentially the same as FIG. 4. Rather than a connection between pipe ends, as in FIG. 4, however, FIG. 5 illustrates a joint between a closure 49 and a pipe end or container 50. Also, the parts are bolted rather than clamped together. The elements have respective flanges 51 and 52 held in abutting contacting relation by installed bolts 53. Closure 49 has a nose 54 received in member 50 and formed, like the nose 44 of FIG. 4, with a taper surface 55, a cylindrical surface 56 and a transverse shoulder 57. Part 50, like part 35 of FIG. 4, has interior taper, cylindrical and shoulder surfaces 58, 59 and 61. These cooperate with the surfaces 55—57, and with an O-ring 62, in the manner and to the same end as set out in connection with FIG. 4, the interengagement of the parts making an effective radial seal which is securely maintained against excessive bowing or other stress tending longitudinally to separate the joined parts.

FIGS. 4 and 5 show the concept of radial sealing, which is a part also of the disclosure of FIG. 1, applied to other installations of a kind in which compressible O-rings frequently are used.

What is claimed is:

1. A pipe joint or the like, including a first body member having a through longitudinal opening, a pipe end received in one end of said opening and having a flared terminal, a second body member received in the other end of said opening and having a threaded connection with the first said body member, said second body member having a conical terminal brought to mating contact with the flared terminal on said pipe end by advance of said second member into said first body member, means defining spaced apart shoulders on said first and second body members, a resilient ring seal mounted to seat against the shoulder on the first said member in common sealing contact with said pipe end and said first body, means interposed between the shoulder on said second body member and said ring seal to obtain a longitudinal compression of said ring seal in response to advance of said second body member into said first member, said interposed means having a portion bearing on the joint between the flared terminal of said pipe and the conical end of said second body member whereby to provide in said resilient ring seal means to compensate for relaxation in the structural members of the joint, and a further resilient ring seal interposed between said interposed means and the shoulder on said second body member.

2. A joint construction, including a pair of joint members brought to an assembled position by a relative axial approaching motion, one of said members being received within the other, means on said members defining an O-ring groove, a compressible O-ring in said groove, and means obtaining in response to a relative axial approaching motion of said members to assembled position first a lateral compression of said O-ring and then a longitudinal compresion thereof, said last named means including parallel cylindrical surfaces on said members defining the extent of radial compression of said O-ring and maintaining such compression constant as against limited relative longitudinal movement of said members, each of said surfaces terminating at their one ends in abutment shoulders at right angles to said cylindrical surfaces and approximately parallel to one another, at least one of said cylindrical surfaces terminating at its other end in a taper for applying said radial compression.

3. A joint construction including a pair of joint members brought to an assembled position by a relative axial approaching motion, one of said members being received within the other, a taper formation on one of said members terminating in a cylindrical surface, said other member having a cylindrical surface which in the assembled position of the joint is in spaced parallel relation to the cylindrical surface on said one member, and a compression O-ring between said members having a normal diameter greater than the spacing between said cylindrical surfaces, assembly of the joint producing a radial compression of said O-ring in the initial relative approaching motion of said members, which compression is maintained at a constant value throughout limited relative longitudinal motion of said members, the cylindrical surface on said one member terminating at its other end in an abutment shoulder at right angles to said cylindrical surface and the cylindrical surface on said other member terminating at one end thereof in an opposing approximately parallel abutment shoulder.

4. A joint construction providing a radially sealed joint, including a pair of joint members brought to an assembled position by a relative axial approaching motion, one of said members being received within the other, transverse abutment means on said members defining between said members an annular groove, said members having cylindrical surfaces which in the assembled position of the joint are in spaced parallel relation to one another, a compressible O-ring in said groove, said O-ring having a normal diameter greater than the spacing between said cylindrical surfaces, and taper means on at least one of said members terminating in the cylindrical surface thereon and responding to a relative axial approaching motion of said members in which said transverse abutment portions approach one another radially to compress said O-ring, said O-ring being thrust longitudinally by said approaching motion to and between said cylindrical surfaces and seating between said abutment portions for application of a longitudinal compression to the ring, the radial compression of said O-ring being constant as against relaxations in the applied longitudinal compression.

5. A pipe joint or the like, including a first body member having a through longitudinal opening, a pipe end received in one end of said opening and having a flared terminal, a second body member received in the other end of said opening and having a threaded connection with the first said body member, said second body member having a conical terminal brought to mating contact with the flared terminal on said pipe end by advance of said second member into said first body member, means defining spaced apart shoulders on said first and second body members, a resilient ring seal mounted to seat against the shoulder on the first said member in common sealing contact with said pipe end and said first body, and means interposed between the shoulder on said second body member and said ring seal to obtain a longitudinal compression of said ring seal in response to advance of said second body member into said first member, said interposed means having a portion bearing on the joint between the flared terminal of said pipe and the conical end of said second body member whereby to provide in said resilient ring seal means to compensate for relaxation in the structural members of the joint, said first body member having a taper formation applying a predetermined lateral compression to said resilient ring seal.

References Cited in the file of this patent

UNITED STATES PATENTS

| | | |
|---|---|---|
| 818,706 | O'Neill | Apr. 24, 1906 |
| 1,440,349 | Foltz | Dec. 26, 1922 |
| 1,638,224 | Vandergrift | Aug. 9, 1927 |
| 2,080,271 | Hirst | May 11, 1937 |
| 2,251,715 | Parker | Aug. 5, 1941 |
| 2,316,711 | Parker | Apr. 13, 1943 |
| 2,398,555 | Parker | Apr. 16, 1946 |
| 2,437,632 | Wolfram | Mar. 9, 1948 |
| 2,462,323 | Hurst | Feb. 22, 1949 |
| 2,463,196 | Parker | Mar. 1, 1949 |
| 2,470,818 | Hirsh | May 24, 1949 |
| 2,474,319 | Muller | June 28, 1949 |
| 2,478,149 | Wolfram et al. | Aug. 2, 1949 |
| 2,630,388 | Snyder | Mar. 3, 1953 |
| 2,759,360 | Budnick | Aug. 21, 1956 |

FOREIGN PATENTS

| | | |
|---|---|---|
| 313,579 | Great Britain | June 20, 1929 |
| 114,356 | Australia | Dec. 5, 1941 |
| 867,769 | Germany | Jan. 3, 1953 |